May 28, 1957  D. R. HENDRICKSON  2,793,897
GATE LATCH FOR ANIMAL PENS
Filed May 10, 1956  2 Sheets-Sheet 1

Don R. Hendrickson
INVENTOR.

May 28, 1957 D. R. HENDRICKSON 2,793,897
GATE LATCH FOR ANIMAL PENS
Filed May 10, 1956 2 Sheets-Sheet 2

Don R. Hendrickson
INVENTOR.

United States Patent Office 2,793,897
Patented May 28, 1957

2,793,897

GATE LATCH FOR ANIMAL PENS

Don R. Hendrickson, Lakefield, Minn.

Application May 10, 1956, Serial No. 584,056

5 Claims. (Cl. 292—210)

The present invention relates to new and useful improvements in gates and more particularly to a gate latch mechanism.

An important object of the invention is to provide a gate latch mechanism for a group of animal pens wherein a plurality of gates close against a single gate post and individual latch means is provided for each gate and mounted on the post.

Another object is to provide individual latch means for a pair of gates connecting an alley with a pair of animal pens and latch means for a third gate connecting the two pens and wherein all of the latch means are mounted on a single gate post.

A further object is to provide a swingable locking member for each latch and which is locked against the post.

A still further object is to provide a device of this character of simple and practical construction, which is efficient and reliable in operation, strong and durable relatively inexpensive to manufacture and otherwise well adapted for the purpose for which the same in intended.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 4 is a perspective view of one of the latch members; and

Figure 1:
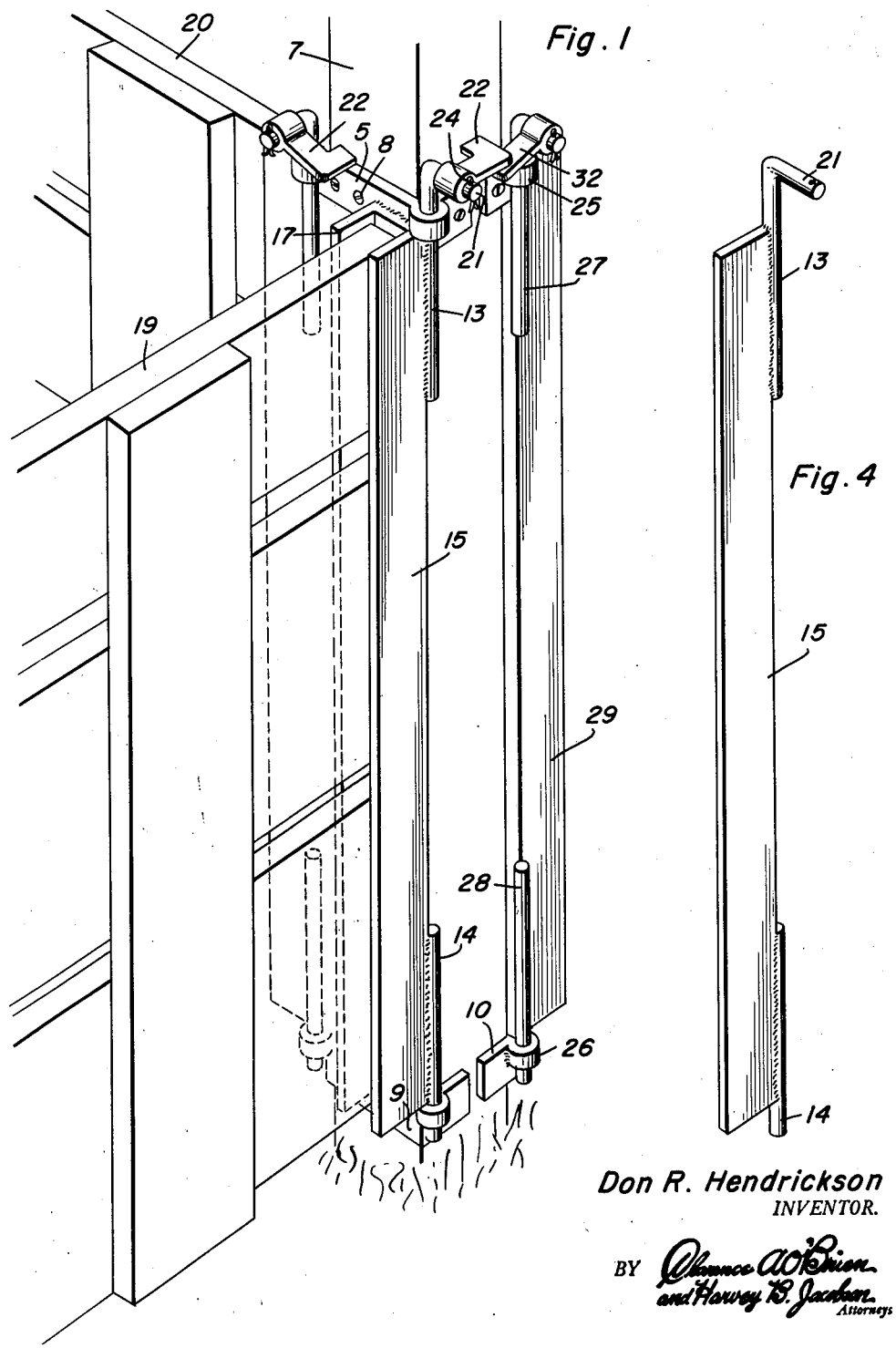
Figure 1 is a perspective view.

Referring now to the drawings in detail, wherein for the purpose of illustration I have disclosed a preferred embodiment of my invention, the numerals 5 and 6 designate a pair of upper U-shaped attaching brackets secured to the upper portion and at the opposite sides of a square-shaped gate post 7 by screws or other suitable fasteners 8, and a pair of lower U-shaped attaching brackets 9 and 10 are similarly attached to the lower portion of the post under the respective upper brackets.

The upper and lower brackets 5 and 9 are of duplicate construction, while upper and lower brackets 6 and 10 are also of duplicate construction and differ slightly from brackets 5 and 9 as hereinafter explained.

Brackets 5 and 9 are each provided with bearing eyes 11 and 12 at the corners of the brackets and with the eyes of the upper and lower brackets aligned with each other to receive upper and lower hinge pins or rods 13 and 14 in the respective aligned eyes.

Vertical strap iron latch plates 15 and 16 are welded at one edge to the respective pairs of upper and lower pins or rods 13 and 14, and if desired a single hinge pin or rod may be provided in place of the pair of pins or rods. The lower end of the latch plate is supported on the lower eye.

A pair of vertical stop plates 17 and 18 are also welded to the upper and lower brackets 5 and 9 and are preferably of angle iron construction and positioned adjacent the respective aligned eyes and with the stop plates respectively projecting outwardly at adjacent sides of the post 7 for engagement by the free ends of a pair of gates 19 and 20 which are positioned at right angles to each other when closed against the respective stop plates.

Gate 19 is locked by swinging the latch plate 15 against the outside thereof in a position parallel to and spaced from the stop plate 17 and gate 20 is similarly locked by the latch plate 16.

The upper end of each upper hinge pin or rod is formed with an outwardly extending pivot pin 21 on which a substantially L-shaped locking dog 22 is pivoted by an eye 23 at one end of the dog, while the other end of the dog projects inwardly toward the post 7 to rest on top of the upper bracket 5 in abutting engagement with the post to lock the related hinge pin or rod and the latch plate from swinging in a gate unlatching movement. The eye 23 of the dog is retained on the pivot pin 21 by a cotter pin 24.

The upper and lower brackets 6 and 10 are provided with single aligned bearing eyes 25 and 26 at the corner of the post adjacent the latch means for gate 19 and upper and lower hinge pins or rods 27 and 28 are pivoted in the eyes 25 and 26 for a latch plate 29 to lock the free end of a third gate 30 against a stop plate 31 carried by the brackets 6 and 10. Upper hinge pin or rod 27 is also provided with a pivoted locking dog 32 which is swingable into abutting position with the post to lock the latch plate 29 and gate 30 closed.

Gate 30 is positioned in longitudinal alignment with gate 19 when both are closed to provide access to a pair of animal pens 33 and 34 from a common alley 35 and the pens are separated from each other by the gate 20. Accordingly, animals may enter either of the pens from the alley by opening the respective gates 19 and 30 and the animals may be moved from one pen to the other by opening gate 20.

Figure 2:
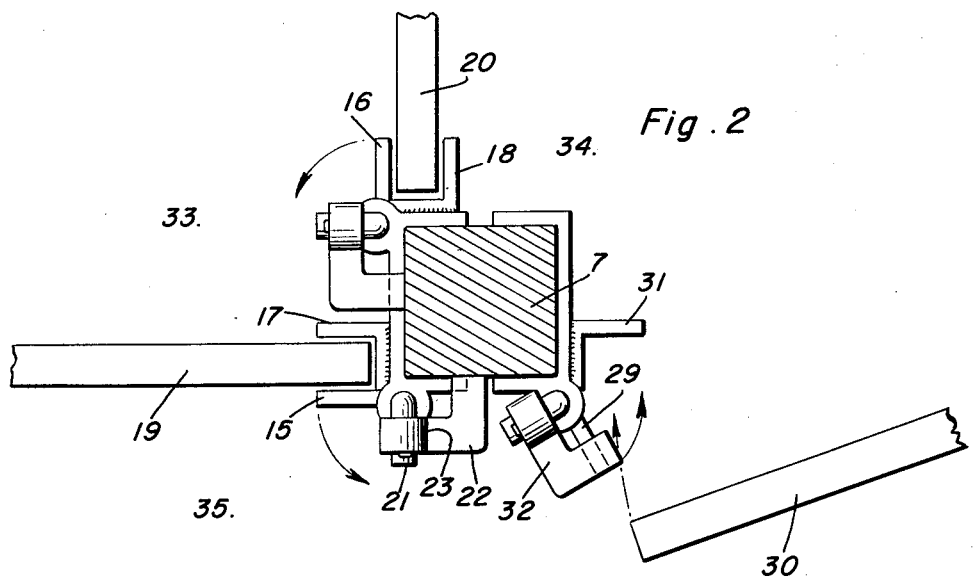
Figure 2 is a top plan view.
Figure 3:
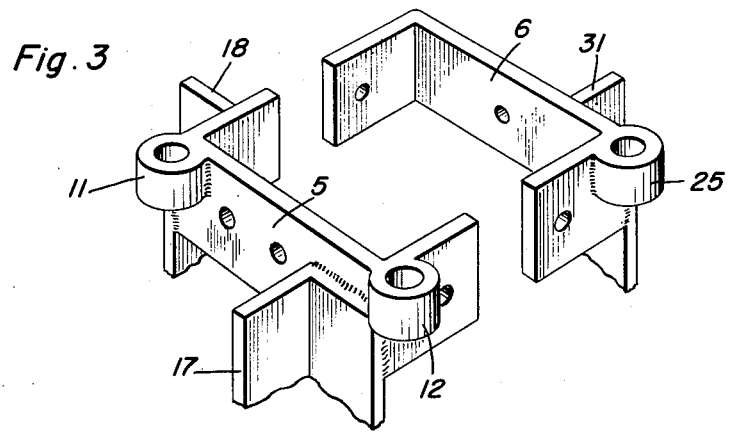
Figure 3 is an enlarged perspective view of the attaching brackets for the latch mechanism.
Figure 5:
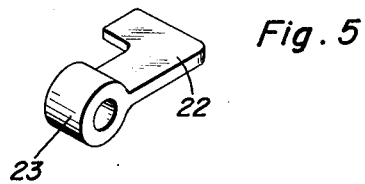
Figure 5 is an enlarged perspective view of one of the locking members.

Each gate is locked by their related latch plates and locking dogs and when the locking dogs are released for opening the gate the dog rests on top of its related latch plate, as shown at 32 in Figure 2, to maintain the dog in convenient position for swinging quickly into a locked position merely by flipping the dog over.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. A gate latch comprising an attaching bracket adapted for attaching to a gate post, a stop on the bracket for a gate, an eye on the bracket, a rod pivoted in the eye, a latch carried by the rod for swinging into and out of latching engagement with the gate to lock the gate between the stop and the latch, and means carried by the pin and movable into engagement with the post for locking the latch in closed position.

2. A gate latch comprising an attaching bracket adapted for attaching to a gate post, a stop on the bracket for a gate, an eye on the bracket, a rod pivoted in the eye, a latch carried by the rod for swinging into and out of latching engagement with the gate to lock the gate between the stop and the latch, and a locking dog pivotally carried by the pin and swingable into engagement with the post to lock the latch in closed position.

3. A gate latch comprising an attaching bracket adapted for attaching to a gate post, a stop on the bracket for a gate, an eye on the bracket, a rod pivoted in the eye, a latch carried by the rod for swinging into and out of latching engagement with the gate to lock the gate between the stop and the latch, said pin having an outwardly projecting upper end, and a locking dog pivoted on said upper end of the pin and swingable into engagement with the post to lock the latch in closed position.

4. In combination, a gate post, an upper bracket and a lower bracket attached to the post, a plurality of stops projecting outwardly from the brackets in the path of closing movement of a plurality of gates, a plurality of vertically aligned pairs of bearing eyes carried by the brackets, a vertical pin pivotally mounted in each pair of aligned eyes, a latch fixed to each pin for swinging into and out of engagement with an adjacent gate to lock the gate, and means carried by the pin and movable into engagement with the posts for locking the latch in its closed position.

5. The construction of claim 4, wherein said means comprises a vertically swingable dog movable into and out of engagement with the post to oppose turning of the pin in a latch releasing movement.

References Cited in the file of this patent
UNITED STATES PATENTS

| | | |
|---|---|---|
| 889,239 | Johnson | June 2, 1908 |
| 1,538,581 | O'Connor | May 19, 1925 |